(12) United States Patent
Shih et al.

(10) Patent No.: US 7,154,063 B2
(45) Date of Patent: Dec. 26, 2006

(54) SMALL HOLE ELECTRIC DISCHARGE MACHINING EQUIPMENT AUTOMATIC ELECTRODE CHANGE DEVICE AND METHOD

(75) Inventors: Chiao-chin Shih, Chang Hua (TW); Yu-hua Wei, Chang Hua (TW)

(73) Assignee: Castek Mechatron Industry Co., Ltd., Chang Hua (TW)

( * ) Notice: Subject to any disclaimer, the term of this patent is extended or adjusted under 35 U.S.C. 154(b) by 0 days.

(21) Appl. No.: 10/926,030

(22) Filed: Aug. 26, 2004

(65) Prior Publication Data

US 2005/0252887 A1    Nov. 17, 2005

(30) Foreign Application Priority Data

May 13, 2004    (CN)    ............... 200410037781

(51) Int. Cl.
*B23H 1/04*    (2006.01)
(52) U.S. Cl. ................................. 219/69.15
(58) Field of Classification Search ............. 219/69.15
See application file for complete search history.

(56) References Cited

U.S. PATENT DOCUMENTS 4,596,066 A * 6/1986 Inoue ............... 483/4
5,674,170 A * 10/1997 Girardin ............... 483/59
6,448,528 B1 * 9/2002 Yoshida ............... 219/69.15

FOREIGN PATENT DOCUMENTS

| JP | 56-139835 A | * 10/1981 | ............... 219/69.15 |
| JP | 8-290332 A | * 11/1996 | |
| JP | 2003-71641 A | * 3/2003 | |

\* cited by examiner

*Primary Examiner*—Geoffrey S. Evans
(74) *Attorney, Agent, or Firm*—Troxell Law Office, PLLC

(57) ABSTRACT

A small hole electric discharge machining equipment automatic electrode change device having an electrode docking turntable having a plurality of mounting slots located at equal intervals, each with a magnet, holding an electrode chuck. When changing a used electrode chuck on the quick-release collet is required, a first cylinder moves the electrode docking turntable forward and the mounting slot receives the used electrode chuck, which is attracted to one magnet. The quick-release collet then releases the used electrode chuck. The machining rotatory spindle automatically rises and the electrode docking turntable returns to an original position. The electrode docking turntable rotates and positions a new electrode chuck below the quick-release collet. The electrode machining rotatory spindle then lowers attaching the electrode chuck to the quick-release collet, following which the electrode docking turntable returns to the original position, removing the electrode chuck from the mounting slot.

15 Claims, 9 Drawing Sheets

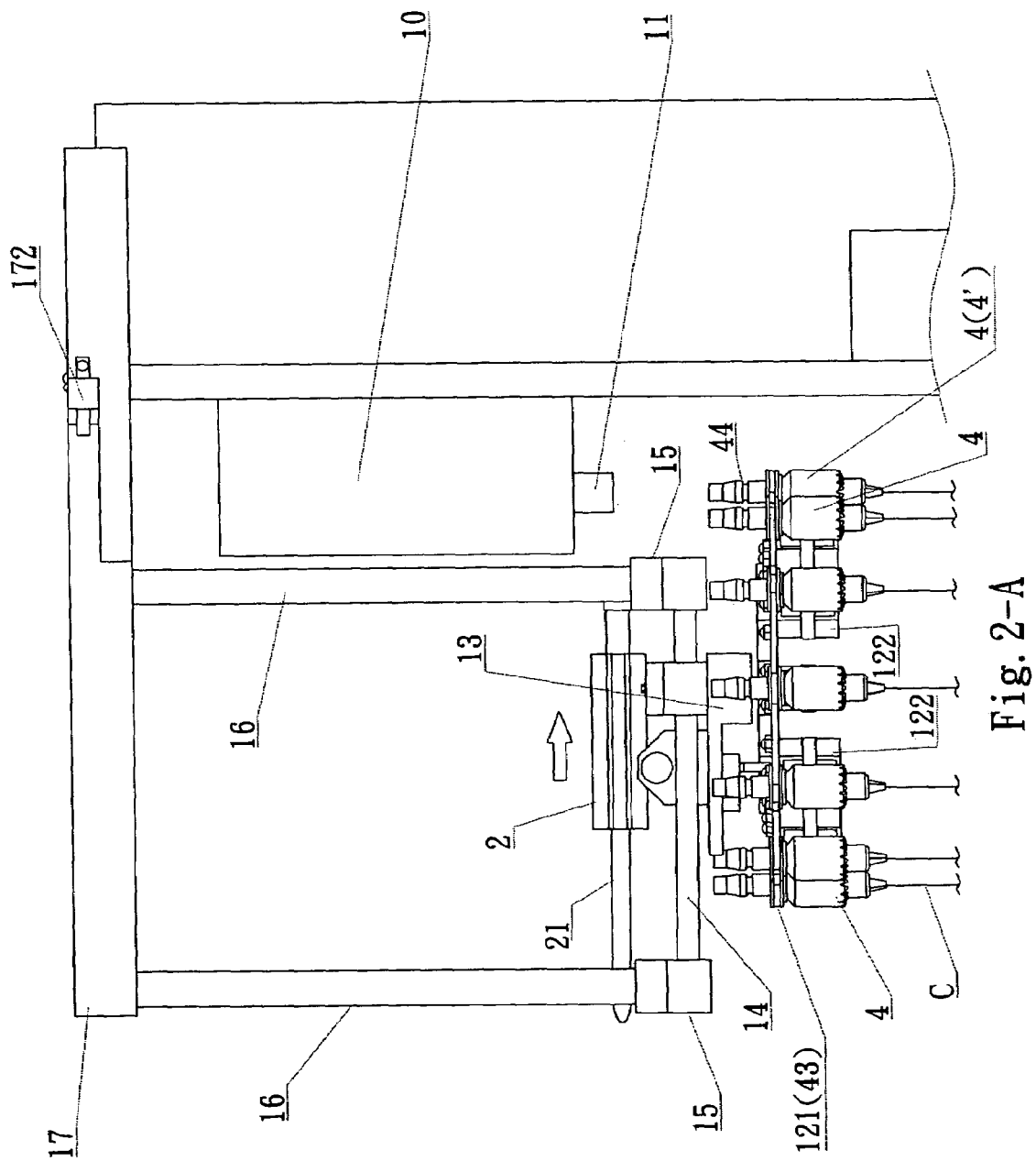
Fig. 2-A

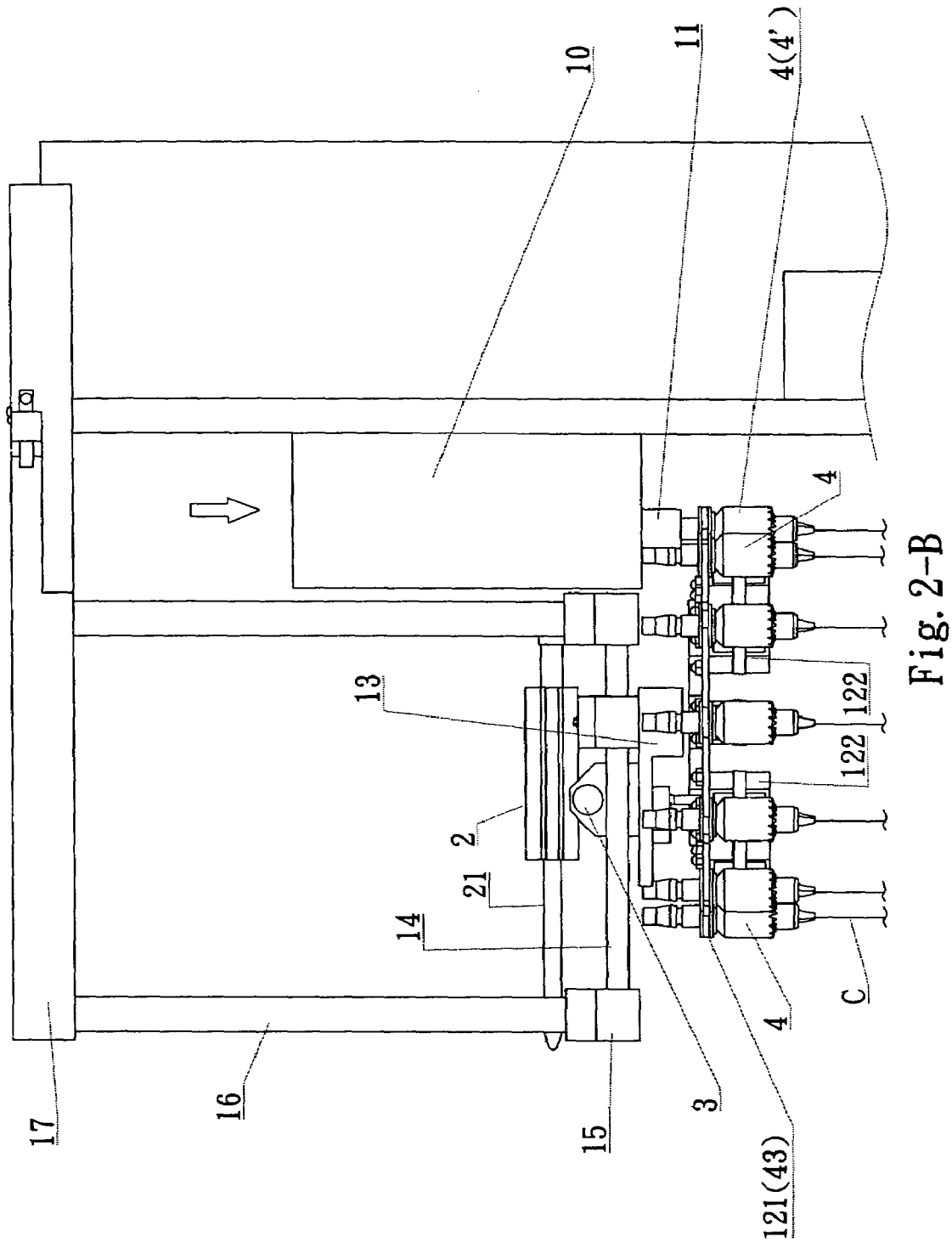

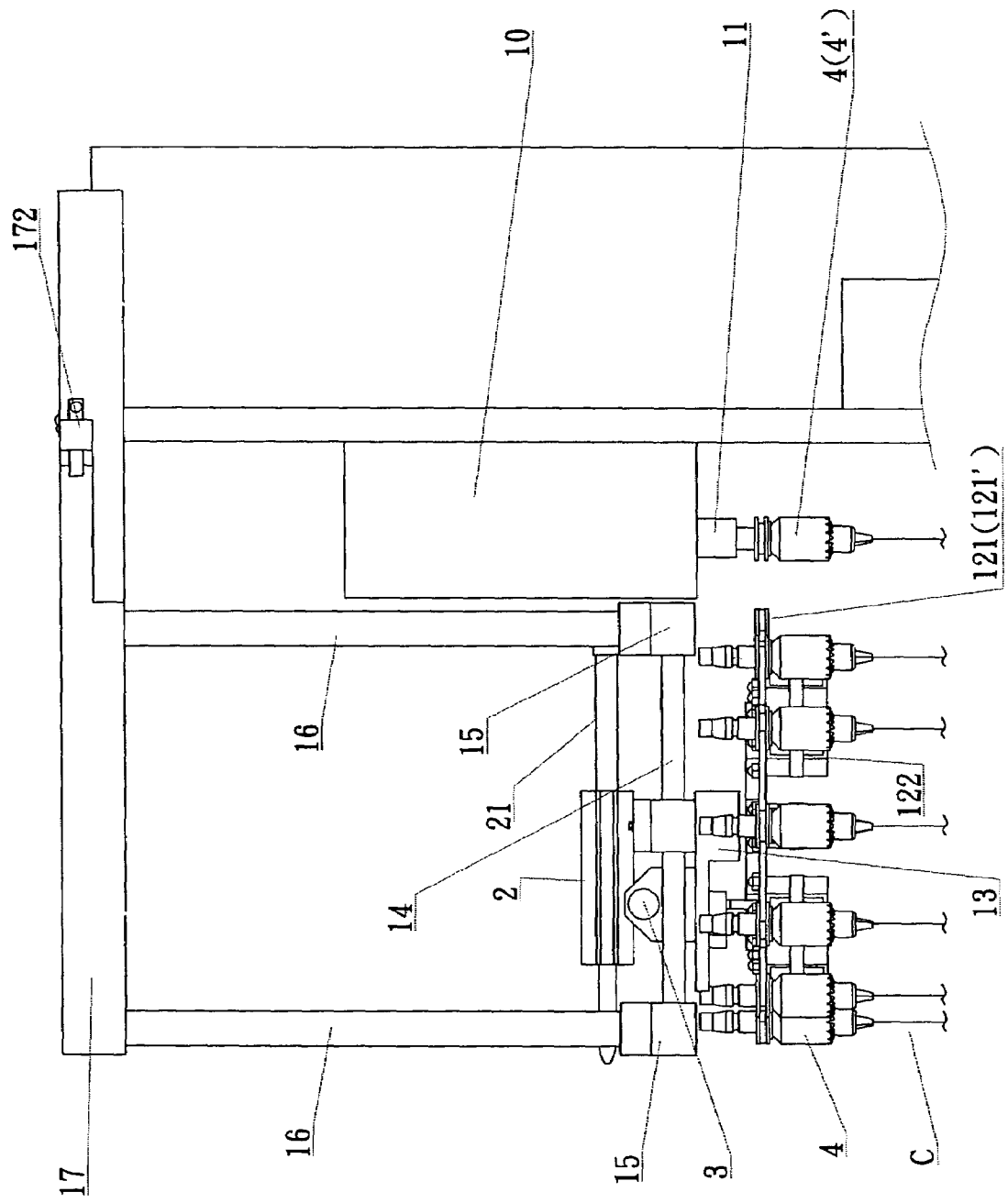

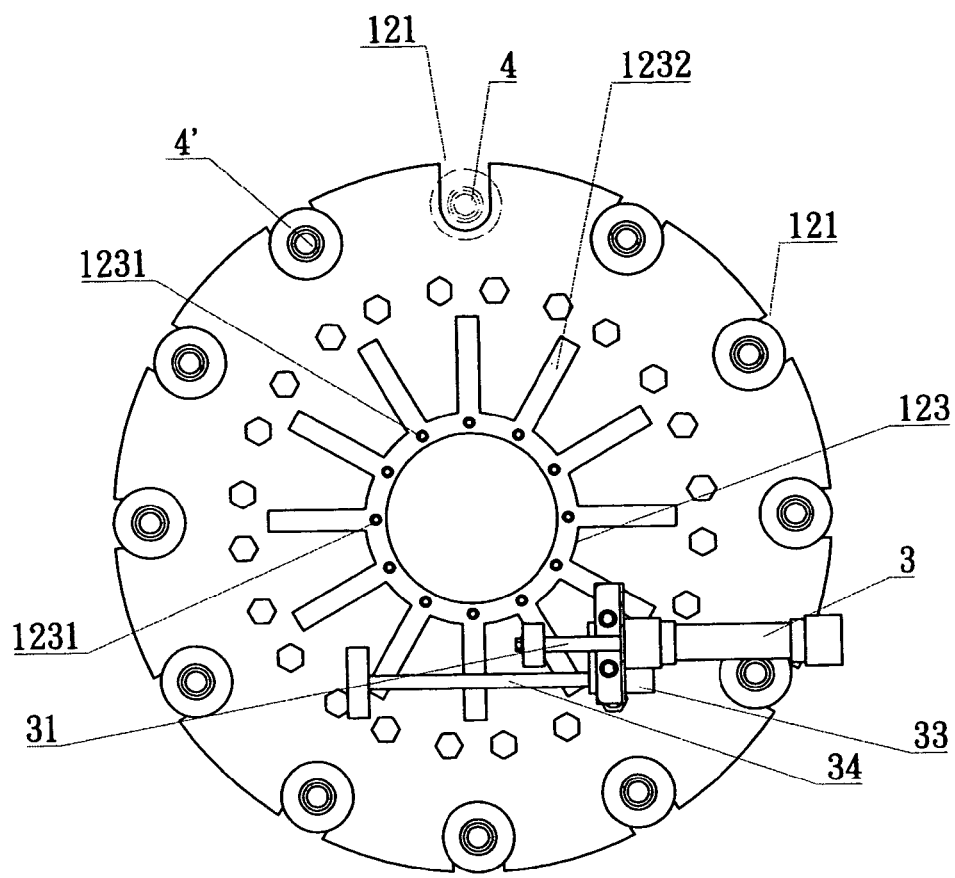
Fig. 4-A
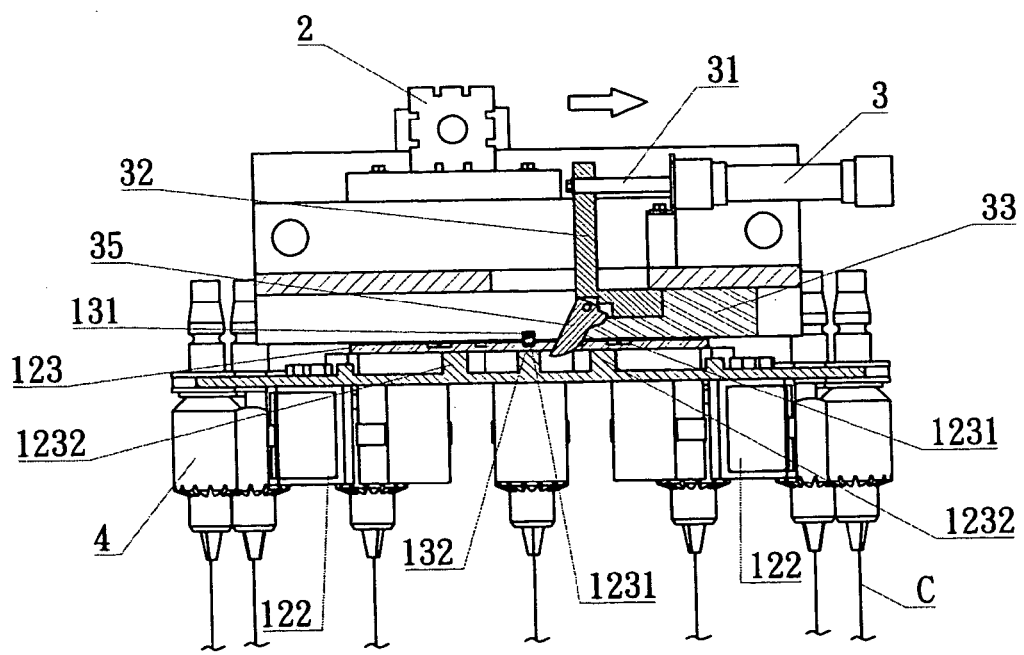
Fig. 3-A

SMALL HOLE ELECTRIC DISCHARGE MACHINING EQUIPMENT AUTOMATIC ELECTRODE CHANGE DEVICE AND METHOD

BACKGROUND OF THE INVENTION

1) Field of the Invention

The invention herein relates to a small hole electric discharge machining equipment automatic electrode change device that does not require manual labor and automatically replaces electrodes to increase utilization efficiency.

2) Description of the Prior Art

Conventional small hole electric discharge machining equipment typically consist of an electrode chuck situated at the lower extent of a machining rotatory spindle, the said electrode chuck holds an electrode and the machining rotatory spindle enables the electrode to perform electrical discharge machining as required.

SUMMARY OF THE INVENTION

I. Problems

The prior art requires manual electrode installation and removal which creates at minimum the following shortcomings:

1. Since the electrode chuck is positioned at the lower extent of the machining rotate spindle that cannot be taken off, the electrode can only be installed and removed by loosening or tightening the electrode chuck; as such, the very small and long electrode tube is installed on the electrode chuck that if precautions are not observed, improper installation produces a slanted disposition that affects machining.

2. When replacing the electrode, fully automated requirements cannot be achieved because of the manual operation involved.

II. Solutions

1. The invention herein by design features a discrete electrode chuck and machining rotatory spindle, utilizing in between them a quick-release collet that is disposed on the machining rotatory spindle, enabling the automatic tightening and release of the said electrode chuck, and wherein prior to installation, the electrode is first mounted in the electrode chuck.

2. The invention herein utilizes an electrode docking turntable having mounting slots and magnets that are circularly disposed at equal intervals apart, thereby providing for the support and magnetically attracted positioning of a plurality of electrode chucks, a first cylinder then revolves the electrode docking turntable forward and backward, with the quick-release collect freeing the electrode chuck before the machining rotatory spindle ascends and the quick-release collet engaging the electrode chuck after it descends, thereby providing rapid electrode change performance and eliminating possible problems attributed to manual installation.

3. The invention herein also has a second cylinder than impels a push rod, and the said push rod nudges a rib disposed at equal intervals apart on the said electrode docking turntable to revolve it an appropriate angle; a spring is utilized downward against a steel ball that enters one of a plurality of locating holes that are disposed at equal intervals apart on the electrode docking turntable such that for each angle of rotation, the said steel ball becomes nested into a locating hole and, at the same time, one electrode chuck is positioned in one of the plurality of mounting slots and is situated at the anterior extent of the machining rotatory spindle quick-release collet, the said electrode change operation thereby providing for multiple automatic electrode change convenience and saving electrical discharge machining time.

4. In the invention herein, since the electrodes are accurately pre-positioned on the electrode docking turntable and do not require corrective re-positioning following automatic electrode change, the electrical discharge machining of machining objects is accomplished with less electrical discharge machining equipment downtime and increased machining efficiency.

5. The invention herein takes into consideration work table interference from the said electrode docking turntable and electrodes and, therefore, disposes the electrode docking turntable on a braced frame which has a hinge on one side and Z-shaped faceted divide that is sleeve fastened, wherein moving the sleeve separates the Z-shaped facet area to provide for opening the said electrode docking turntable and the electrodes by means of the hinge, enabling the jobber to finish the machining object or other item on the machining table.

III. Effects of the Invention

1. Installation convenience, installation time savings, and increases machining efficiency.

2. Does not require switching off equipment and manual labor to replace electrodes, thereby raising overall machining rates.

3. During prolonged electrical discharge machining and electrode change that requires more electrode machining, the present invention saves manpower and reduces costs.

BRIEF DESCRIPTION OF THE DRAWINGS

The drawings of the embodiments of the small hole electric discharge machining equipment automatic electrode change device below are followed by the detailed description of the invention herein.

FIG. 2-A is an orthographic drawing that illustrates the operation of the invention herein.

FIG. 2-B is an orthographic drawing that illustrates the operation of the invention herein.

FIG. 2-C is an orthographic drawing that illustrates the operation of the invention herein.

FIG. 3-A is a cross-sectional drawing of the electrode docking turntable of the invention herein.

FIG. 4-A is an orthographic drawing of FIG. 3-A.

FIG. 6-A is an isometric drawing that depicts the operation of the toggle latch of the invention herein.

FIG. 6-B is an isometric drawing that depicts the operation of the toggle latch of the invention herein.

DETAILED DESCRIPTION OF THE INVENTION

Figure 1:
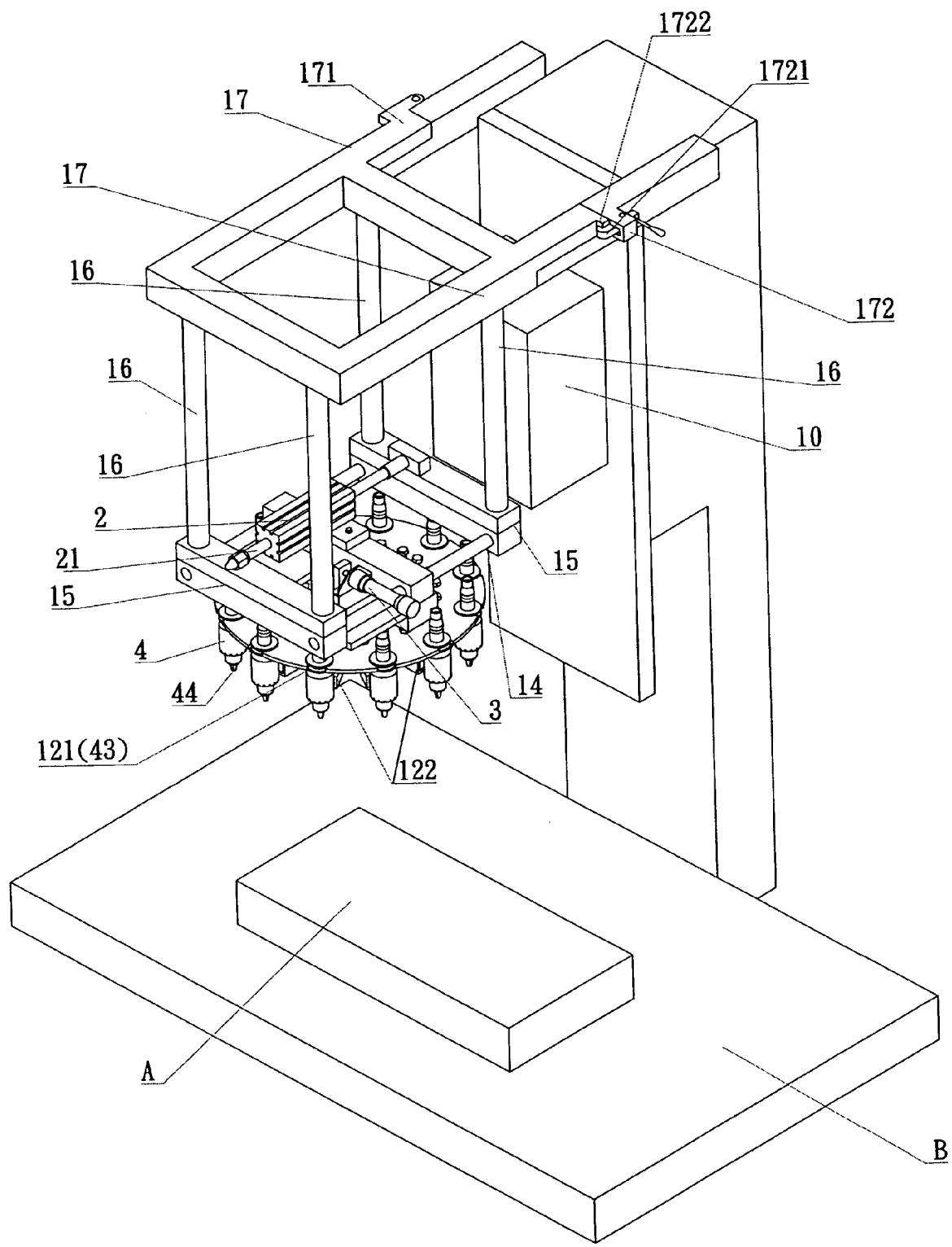
FIG. 1 is an isometric drawing of the invention herein.

Referring to FIG. 1, the small hole electric discharge machining equipment, a machining object A placement machining table B is situated at its anterior extent with a driven machining rotatory spindle 10 mechanism at the posterior extent of the machine platform, the said mechanism driven by a servo-motor (a conventional device not shown in the drawings); the controlled machining rotatory spindle 10 is moved upward and downward by an articulating apparatus (not within the scope of the invention herein and thus not further elaborated) that raises the machining rotatory spindle 10 to a preset highest point and lowest point during electrode change.

Figure 2:
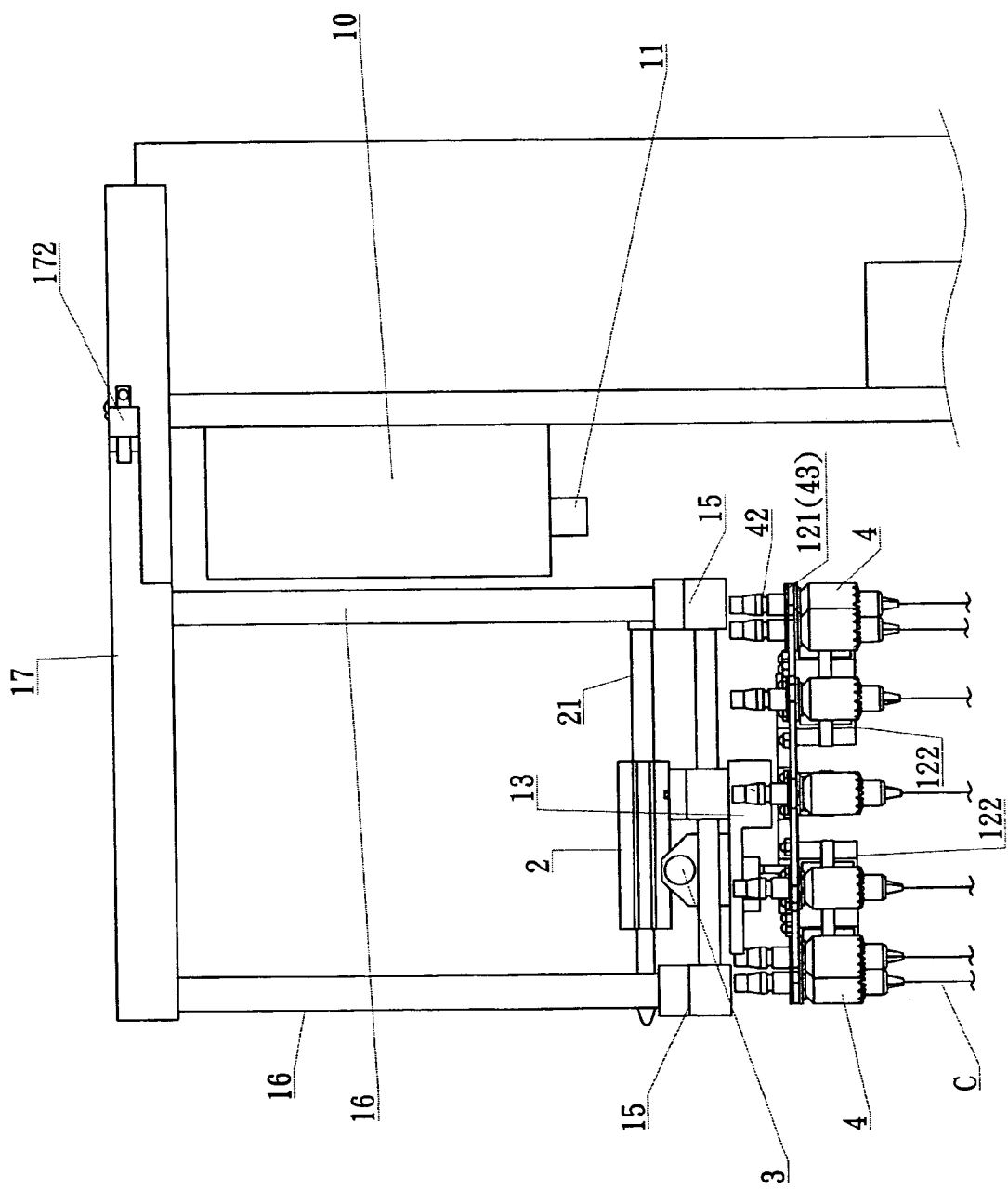
FIG. 2 is an orthographic drawing that illustrates the operation of the invention herein.
Figure 4:
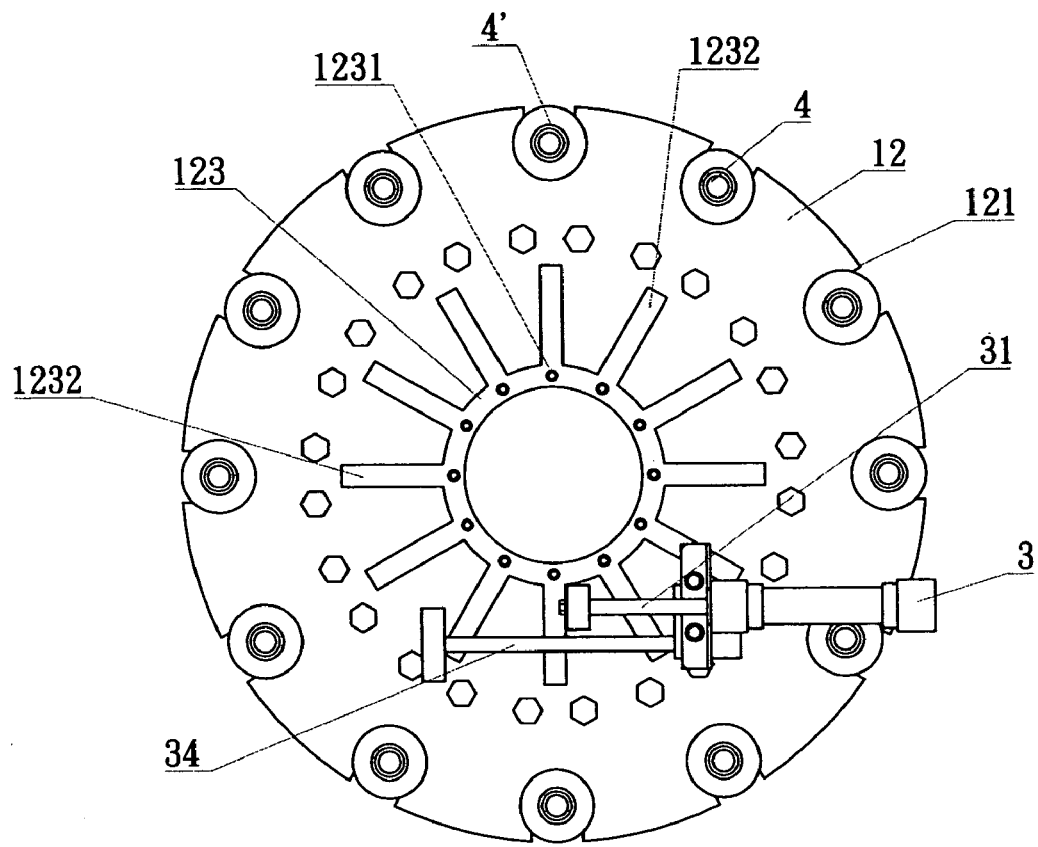
FIG. 4 is an orthographic drawing of FIG. 3.
Figure 3:
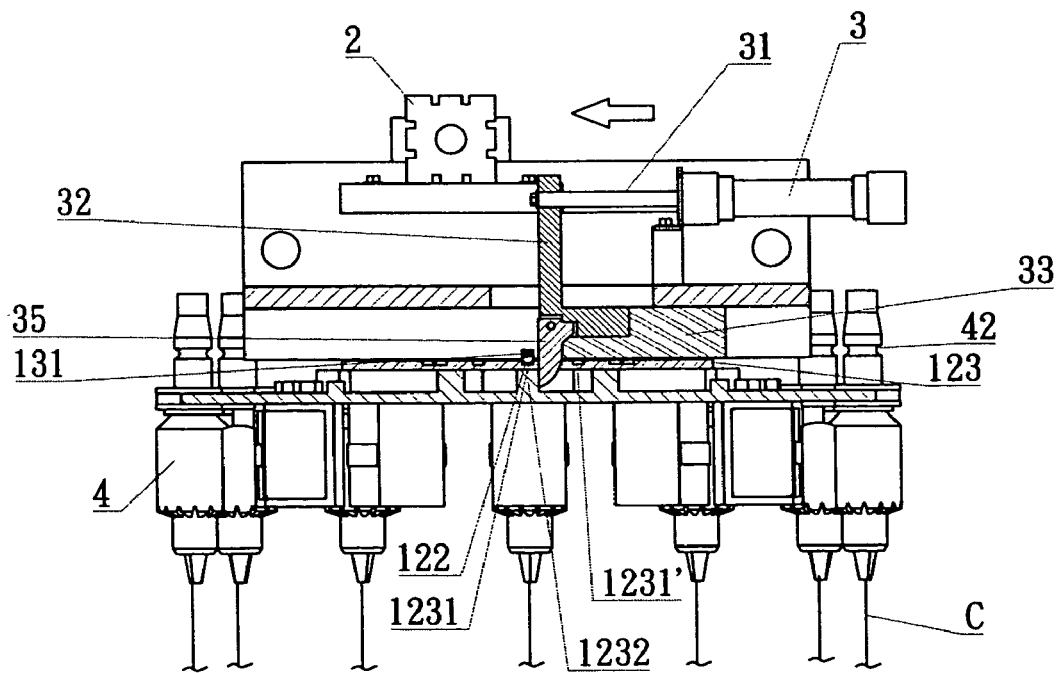
FIG. 3 is a cross-sectional drawing of the electrode docking turntable of the invention herein.

Referring to FIG. 1 and FIG. 2, a quick-release collet 11 is positioned on the lower extent of the said machining rotatory spindle 10 and, furthermore, an electrode docking turntable 12 is situated at the anterior extent; referring to FIG. 3, the said electrode docking turntable 12 consists of a plurality of mounting slots 121 that are circularly disposed at equal intervals apart, with a magnet 122 appropriately situated at each mounting slot 121; additionally, referring to FIG. 3 and FIG. 4, a disc 123 is at the center of the electrode docking turntable 12 and a plurality of locating holes 1231 are situated at equal intervals apart along the circumference of the disc 123 and, furthermore, radiating ribs 1232 are adjoined to the disc 123 outer periphery at equal intervals apart; the said electrode docking turntable 12 spin axis consists of an axle seat 3 at the upper extent and a spring 131 loading a steel ball 132 at the bottom end of the axle seat 13, with the said steel ball 132 capable of entering a said locating hole 1231 such that as the electrode docking turntable 12 is rotated a certain angle, the said steel ball 132 becomes nested in the said locating hole 1231 and thus has simple dividing plate capability that precludes the necessity of expensive index gauges and similar equipment, thereby reducing cost.

Referring to FIG. 1 and FIG. 2, a first slide rail 14 is vertically inserted through the axle seat 13 and, furthermore, each of the two extremities of the first slide rail 14 is fastened onto a support base 15, the support base 15 support rod 16 is fixed to the upper extent of a braced frame 17, and the electrode docking turntable 12 is suspended and stably positioned thereon; a first cylinder 2 is vertically fastened onto the said axle seat 13, its push rod 21 conjoined to the support base 15 near the machining rotatory spindle 10, enabling the first cylinder 2 to move the axle seat 13 and the electrode docking turntable 12 forward and backward on the first slide rail 14.

Referring to FIG. 3, FIG. 4, FIG. 3-A, and FIG. 3-B, a second cylinder 3 is fastened to a suitable position at the upper extent of the axle seat 13, the second cylinder 3 push rod 31 is conjoined to a connecting rod 32 and inserted through a push block 33 fixed to the lower extent of the said axle seat 13, with a second slide rail 34 penetrating the said push block 33, the two extremities of the second slide rail 34 fastened such that the push block 33 is controlled into left and right movement on the second slide rail 34 by the second cylinder 3 and, furthermore, a one-way, linkage-type push rod 35 is hinged to the front end of the said push block 33, the said push rod 35 situated between the said radiating ribs 1232 and utilizes the operation of the second cylinder 3, enabling the second cylinder 3 push rod 31 to lever the connecting rod 32 and thereby move the push block 33 towards the left, while the said push rod 35 is shoved against a said rib 1232, causing the electrode docking turntable 12 to revolve an appropriate angle and, furthermore, as the second cylinder 3 returns to original position, the said push rod 35 of course slips pass the said rib 1232 for the next electrode change, nudging the electrode docking turntable 12 into rotation to the preparatory position.

Figure 5:
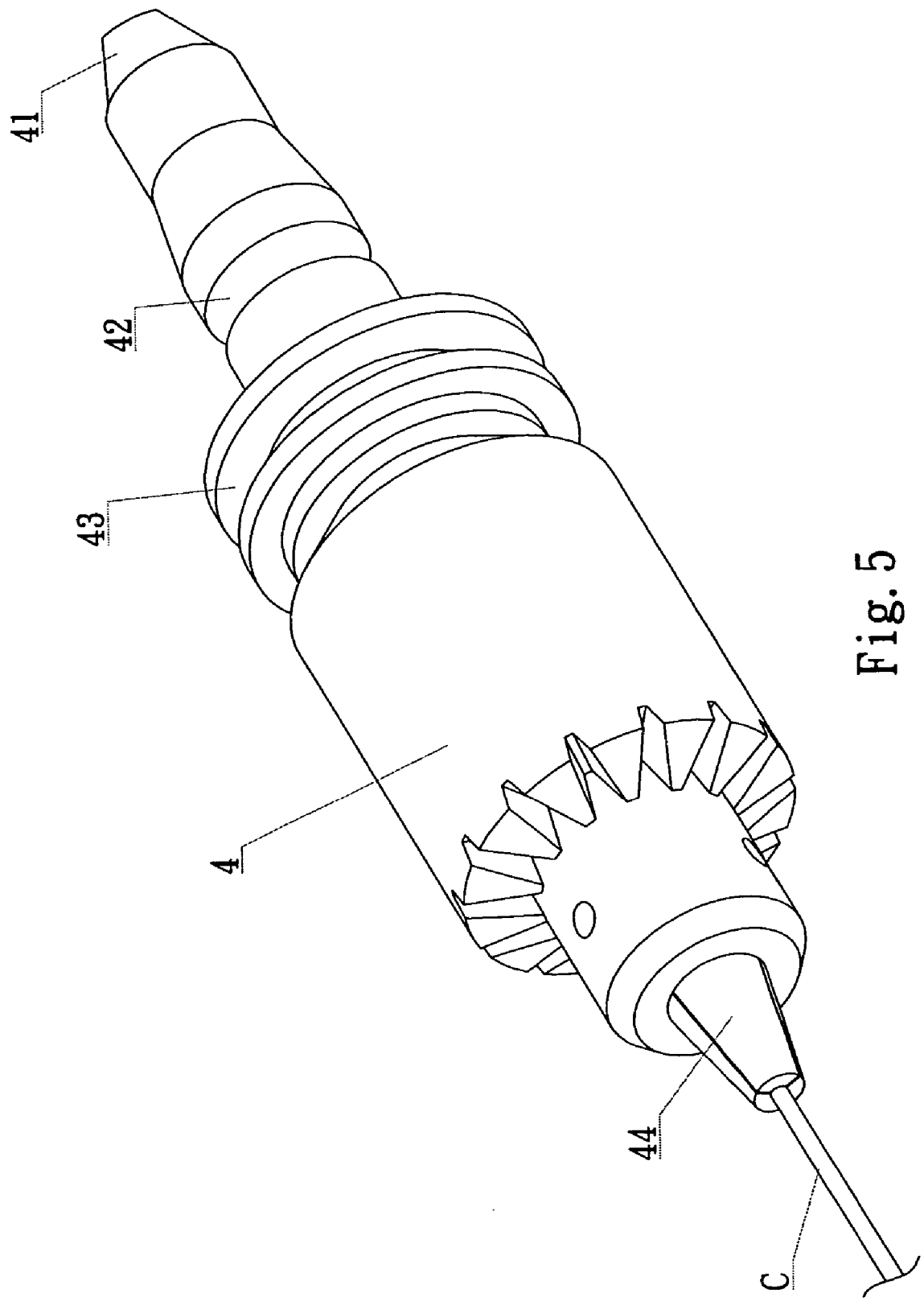
FIG. 5 is an isometric drawing of the electrode chuck of the invention herein.

Referring to FIG. 5, an electrode chuck 4 has a push-pull leakproof gasket 41 at one extremity, a retaining groove 42 formed below that provides for engaging the said quick-release collet 11, a receiving groove 43 disposed at the lower extent of the retaining groove 42, and electrode jaws 44 at the bottom extremity that provide for holding an electrode C; referring to FIG. 1, the receiving groove 43 is utilized for insertion into a said electrode docking turntable 12 mounting slot 121 and at the same time is attracted to the magnet 122 such that the electrode chuck 4 is stored firmly in position within the said mounting slot 121, thereby providing for the automatic replacing and anchoring of the electrode chuck 4 for electrode change.

Figure 6:
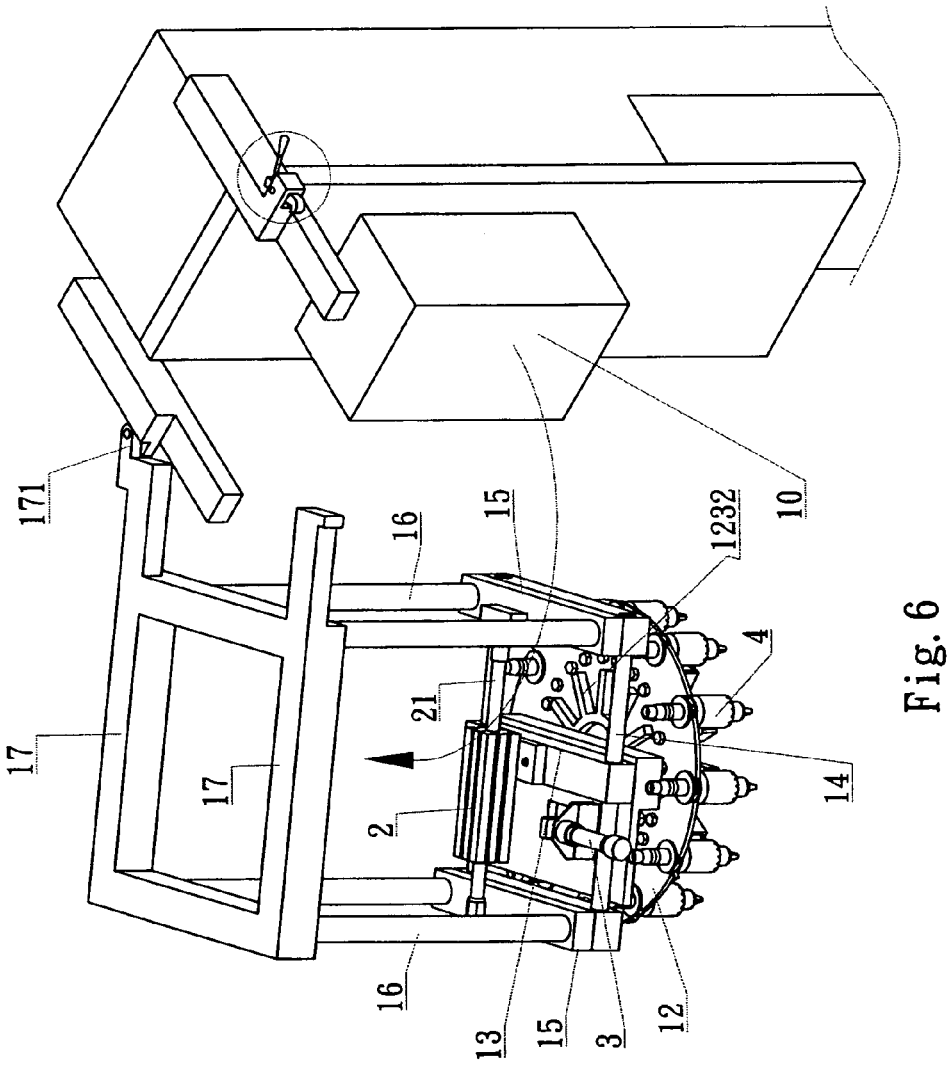
FIG. 6 is isometric drawing of another embodiment of the invention herein.
Figure 6:
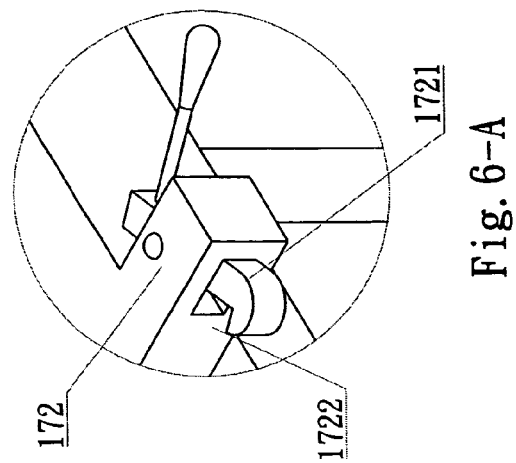
Figure 6:
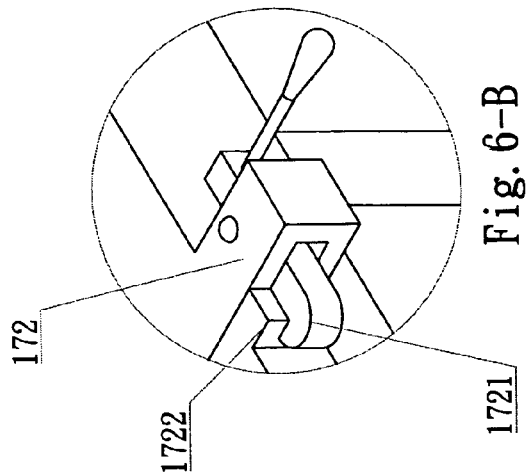

Referring to FIG. 6, FIG. 6-A, and FIG. 6-B, at the two sides of the said braced frame 17 on which the electrode docking turntable 12 is suspended, a hinge 171 is disposed on one side and a toggle latch 172 is built into the other side; when the jobber installs a machining object or other item on the front of the machining table, the clasp head 1721 of the toggle latch 172 is released to open the braced frame 17 and electrode docking turntable 12 on the braced frame 17 via the hinge 171, thereby providing for zero machining interference; when restoring is desired, the braced frame 17 is turned back via the hinge 171 such that a catch hook 1722 automatically pushes open the clasp head 1721 which enters the engaged position, the braced frame 17 to which it is conjoined thereby returned to provide for the automatic installation and change of electrodes.

The electrode installation procedure of the invention herein is as follows:

1. In FIG. 2, an electrode C (as shown in FIG. 5) is first fitted into each of the electrode jaws 44 of the said plurality of electrode chucks 4 and, furthermore, the said receiving grooves 43 are utilized for insertion into a said electrode docking turntable 12 mounting slots 121, enabling the placement of the electrode chucks 4 at equal intervals apart along the circular periphery of the electrode docking turntable 12 which are the same time attracted to the magnets 122, enabling firm positioning and, furthermore, remain removable.

2. Continuing the said procedure, the controlled machining rotatory spindle 10 is raised to an appropriate height.

3. FIG. 2-A is the operation of the first cylinder 2, wherein the axle seat 13 and the electrode docking turntable 12 are moved forward to a fixed point, the electrode chuck 4 on the said electrode docking turntable 12 is then positioned on the quick-release collet 11 at the lower extent of the said machining rotatory spindle 10.

4. FIG. 2-B is the downward movement of the controlled machining rotatory spindle 10, enabling the quick-release collet 11 to ensleeve the leakproof gasket 41 at the upper extremity of the electrode chuck 4 and cover the retaining groove 42 position, the quick-release collet 11 thereby becoming engaged and secured by means of the retaining groove 42.

5. FIG. 2-C is the first cylinder 2 moving the axle seat 13 and the electrode docking turntable 12 back to their original position while the said electrode chuck 4 is separated from the electrode docking turntable 12 mounting slot 121 as well as the attraction of the magnet 122, thereby completing the automatic installation of the electrodes.

The electrode change procedure of the invention herein is as follows:

1. Referring to FIG. 2-C, when an electrode C is electrically discharged during utilization, since the electrode C is eventually worn down to an electrode change length, the machining rotary spindle 10 is controlled to rise to an appropriate position to accept the electrode chuck 4.

2. Continuing the said procedure, the first cylinder 2 moves the electrode docking turntable 12 forward, such that after the said installation, the mounting slots 121 are already controlled (as shown in FIG. 2-C) and thus capable of accepting the said electrode chuck 4 to be replaced, enabling the said mounting slots 121 to accommodate the insertion of the said electrode chuck 4 receiving grooves 43 which are at the same time also positioned by the attraction of the magnets 122 (as shown in FIG. 2-B).

3. The quick-release collet 11 is then controlled to free the electrode chuck 4.

4. The machining rotary spindle 10 is subjected to servo-motor control and is raised to a suitable height, causing electrode jaw 44 separation in the said electrode chuck 4 (as shown in FIG. 2-A).

5. Referring to FIG. 3 and FIG. 4, the operation of the second cylinder 3 follows, wherein the push rod 31 levers the connecting rod 32 and thereby moves the push block 33 on the second slide rail 34 towards the left and the said push rod 35 at the front end of the push block 33 is simultaneously shoved against a said rib 1232 on the electrode docking turntable 12, causing it to revolve an appropriate angle; at the same time, the said steel ball 132 is displaced from the original locating hole 1231 due to the rotation of the electrode docking turntable 12 and is then subsequently nested in another locating hole 1231' such that the electrode docking turntable 12 stops after rotating the required angle; at the same time, alter the said electrode docking turntable 12 has rotated an appropriate angle, the electrode chuck 4 departs from the position at the lower extent of the quick-release collet 11 and the electrode chuck 4 already replaced is substituted by a new electrode chuck 4 that is positioned immediately below the said quick-release collet 11 (as shown in FIG. 2-C and FIG. 2-A).

6. In FIG. 2-B, the controlled machining rotary spindle 10 moves downward such that the quick-release collet 11 ensleeves a new electrode chuck 4' and, furthermore, controls the tightness of the quick-release collet 11 on the electrode chuck 4'.

7. In FIG. 2-C, the operation of the first cylinder 2 returns the axle seat 13 and the electrode docking turntable 12 back to their original position such that the said electrode chuck 4' is separated from the 12 mounting slot 121 as well as the attraction of the magnet 122, thereby restoring the state shown in FIG. 2-C and completing the electrode change task.

8. The said electrode change actions can by the same procedures replace other electrode chucks 4 until the machining of the machining object is finished.

The invention claimed is:

1. A method for operating a small hole electric discharge machining equipment automatic electrode changing device for machining an object on a machining table, which comprises the steps of:
    a) moving a machining rotary spindle located on a machine platform on a back of the machining table to a first spindle position utilizing a servo motor driving a screw, the machining rotary spindle having a quick release collet located on a bottom thereof, the quick release collet having a used electrode chuck of a plurality of electrodes chucks connected thereto;
    b) moving an electrode docking turntable rotatably connected to the axle seat from a second position to a first position connecting the used electrode chuck to the electrode docking turntable;
    c) moving the machining rotary spindle upwardly to a second spindle position and separating the used electrode chuck from the quick release collet;
    d) rotating the electrode docking turntable to a next rotated position of a plurality of rotated positions;
    e) aligning a new electrode chuck of the plurality of electrodes chucks with the quick release collet;
    f) moving the machining rotary spindle downwardly to the first spindle position connecting the new electrode chuck to the electrode docking turntable utilizing the quick release collet,
    g) moving the electrode docking turntable from the first position to the second position separating the new electrode chuck from the electrode docking turntable,
    wherein the rotating step d) utilizes a rotating cylinder fastened to a top of the axle seat and having:
        i) a rotating cylinder push rod;
        ii) a slide rail;
        iii) a connecting rod connected to the rotating cylinder push rod and being slidably located on the slide rail; and
        iv) a push block, the connecting rod being inserted through the push block and having a movement limited by the slide rail; and
        v) a push rod hinged to a front of the push block, the push rod being controlled by the movements of the rotating cylinder and selectively engaging one of a plurality of radiating ribs of the electrode docking turntable and rotating the electrode docking turntable to one of the plurality of rotated positions.

2. The method according to claim 1, wherein the moving step b) utilizes a first cylinder connected to an axle seat and having a push rod connected to at least one of two support bases and selectively moving the electrode docking turntable between the first and second turntable positions.

3. The method according to claim 1, wherein the rotating step d) includes:
    a) moving the electrode docking turntable from the first position to the second position before rotating the electrode docking turntable to the next rotated position; and
    b) moving the electrode docking turntable from the second position to the first position after rotating the electrode docking turntable to the next rotated position.

4. A small hole electric discharge machining equipment automatic electrode changing device for machining an object on a machining table comprising:
    a) a machining rotary spindle located on a machine platform on a back of the machining table and movable between first and second spindle positions by a servo motor driving a screw and having a quick release collet located on a bottom thereof;
    b) a frame assembly connected to the machine platform and having a braced frame, four support rods protruding downwardly from the bottom of the braced frame, two support bases connected between two opposing pairs of the four support rods, first slide rails are connected to first and second ends of the two support bases;
    c) an axle seat slidably connected to the first slide rail and the second slide rail;

d) an electrode docking turntable rotatably connected to the axle seat and having:
  i) a plurality of mounting slots equally spaced around an outer periphery thereof, each of the plurality of mounting slots having a magnet;
  ii) a plurality of locating holes forming a concentric circle equally spaced apart and located a predetermined distance from the outer periphery of the electrode docking turntable; and
  iii) a plurality of radiating ribs protruding radially between the plurality of locating holes and the plurality of mounting slots, one of the plurality of locating holes and one of the plurality of radiating ribs aligning radially with each of the plurality of mounting slots;
e) a first cylinder connected to the axle seat and having a push rod connected to at least one of the two support bases and selectively moving the electrode docking turntable between first and second turntable positions;
f) a second cylinder fastened to a top of the axle seat and having:
  i) a second cylinder push rod;
  ii) a second slide rail;
  iii) a connecting rod connected to the second cylinder push rod and being slidably located on the second slide rail; and
  iv) a push block, the connecting rod being inserted through the push block and having a movement limited by the second slide rail; and
  v) a push rod hinged to a front of the push block, the push rod being controlled by the movements of the second cylinder and selectively engaging one of the plurality of radiating ribs and rotating the electrode docking turntable to one of a plurality of rotated positions;
g) a steel ball located in a bottom of the axle seat slidably and pressed downwardly by a spring, the steel ball engaging one of the plurality of locating holes when the electrode docking turntable is located in one of the plurality of rotated positions; and
h) a plurality of electrodes chucks having:
  i) a push-pull leak proof gasket located on a first end;
  ii) a retaining groove located adjacent to the push-pull leak proof gasket and selectively connected to the quick release collet;
  iii) an electrode jaw located on a second end thereof and holding an electrode; and
  iv) a receiving groove located between the retaining groove and the electrode jaw, and selectively connected to one of the plurality of mounting slots;
wherein, when electrode docking turntable is located in the first turntable position, the electrode docking turntable is moved toward the machining rotary spindle and a selected electrode chuck of the plurality of electrodes chucks is vertically aligned with the quick release collet, the machining rotary spindle moving to the first spindle position and the selected electrode chuck being selectively removed from and reattached on the electrode docking turntable by the quick release collet and by moving the machining rotary spindle upwardly the second spindle position, and when electrode docking turntable is in the second turntable position, the electrode docking turntable is moved away from the machining rotary spindle allowing the machining rotary spindle to move upwardly and downwardly between the second position and downwardly past the first position without obstruction by the electrode docking turntable, wherein the electrode docking turntable is located in a selected rotated position of the a plurality of rotated positions allowing a selected one of the plurality of electrodes chucks to be selectively removed from and reattached on the electrode docking turntable by the quick release collet.

5. The small hole electric discharge machining equipment automatic electrode changing device according to claim 4, wherein the braced frame is pivotally connected to the machine platform at a first end of a connecting side by a hinge and releasably connected to the machine platform at a second end of the connecting side by a toggle latch.

6. The small hole electric discharge machining equipment automatic electrode changing device according to claim 5, wherein the toggle latch has a clasp head and a catch hook.

7. A small hole electric discharge machining equipment automatic electrode changing device for machining an object on a machining table comprising:
a) a machining rotary spindle located on a machine platform on a back of the machining table and movable between first and second spindle positions by a servo motor driving a screw and having a quick release collet located on a bottom thereof;
b) an electrode docking turntable rotatably connected to the axle seat and having:
  i) a plurality of mounting slots equally spaced around an outer periphery thereof, each of the plurality of mounting slots having a magnet;
  ii) a plurality of locating holes forming a concentric circle equally spaced apart and located a predetermined distance from the outer periphery of the electrode docking turntable; and
  iii) a plurality of radiating ribs protruding radially between the plurality of locating holes and the plurality of mounting slots, one of the plurality of locating holes and one of the plurality of radiating ribs aligning radially with each of the plurality of mounting slots;
c) a first cylinder selectively moving the electrode docking turntable between first and second turntable positions;
d) the second cylinder selectively engaging one of the plurality of radiating ribs and rotating the electrode docking turntable to one of a plurality of rotated positions;
e) a steel ball located in a bottom of the axle seat slidably and pressed against the electrode docking turntable by a spring, the steel ball engaging one of the plurality of locating holes when the electrode docking turntable is located in one of the plurality of rotated positions; and
f) a plurality of electrodes chucks selectively connected to one of the plurality of mounting slots.

8. The small hole electric discharge machining equipment automatic electrode changing device according to claim 7, further comprising a frame assembly connected to the machine platform and having a braced frame, four support rods protruding downwardly from the bottom of the braced frame, two support bases connected between two opposing pairs of the four support rods, first slide rails are connected to first and second ends of the two support bases.

9. The small hole electric discharge machining equipment automatic electrode changing device according to claim 8, further comprising an axle seat slidably connected to the first slide rail and the second slide rail.

10. The small hole electric discharge machining equipment automatic electrode changing device according to claim 9, wherein the first cylinder connected to the axle seat and having a push rod connected to at least one of the two support bases and selectively moving the electrode docking turntable between the first and second turntable positions.

11. The small hole electric discharge machining equipment automatic electrode changing device according to claim 10, wherein the second cylinder fastened to a top of the axle seat and having:
   a) a second cylinder push rod;
   b) a second slide rail;
   c) a connecting rod connected to the second cylinder push rod and being slidably located on the second slide rail; and
   d) a push block, the connecting rod being inserted through the push block and having a movement limited by the second slide rail; and
   e) a push rod hinged to a front of the push block, the push rod being controlled by the movements of the second cylinder and selectively engaging one of the plurality of radiating ribs and rotating the electrode docking turntable to one of the plurality of rotated positions.

12. The small hole electric discharge machining equipment automatic electrode changing device according to claim 11, wherein the steel ball is located in a bottom of the axle seat slidably and pressed downwardly by a spring.

13. The small hole electric discharge machining equipment automatic electrode changing device according to claim 12, wherein the plurality of electrodes chucks having:
   i) a push-pull leak proof gasket located on a first end;
   ii) a retaining groove located adjacent to the push-pull leak proof gasket and selectively connected to the quick release collet;
   iii) an electrode jaw located on a second end thereof and holding an electrode; and
   iv) a receiving groove located between the retaining groove and the electrode jaw, and selectively connected to one of the plurality of mounting slots.

14. The small hole electric discharge machining equipment automatic electrode changing device according to claim 13, wherein, when electrode docking turntable is located in the first turntable position, the electrode docking turntable is moved toward the machining rotary spindle and a selected electrode chuck of the plurality of electrodes chucks is vertically aligned with the quick release collet, the machining rotary spindle moving to the first spindle position and the selected electrode chuck being selectively removed from and reattached on the electrode docking turntable by the quick release collet and by moving the machining rotary spindle upwardly the second spindle position, and when electrode docking turntable is in the second turntable position, the electrode docking turntable is moved away from the machining rotary spindle allowing the machining rotary spindle to move upwardly and downwardly between the second position and downwardly past the first position without obstruction by the electrode docking turntable.

15. The small hole electric discharge machining equipment automatic electrode changing device according to claim 13, further comprising wherein the electrode docking turntable is located in a selected rotated position of the a plurality of rotated positions allowing a selected one of the plurality of electrodes chucks to be selectively removed from and reattached on the electrode docking turntable by the quick release collet.

* * * * *